United States Patent [19]

White et al.

[11] Patent Number: 4,850,271
[45] Date of Patent: Jul. 25, 1989

[54] ROUND BALER HAVING SIMULATED BALE SIZE AND SHAPE INDICATOR

[75] Inventors: Bruce L. White, North Newton; Stanley R. Clark, Hesston, both of Kans.

[73] Assignee: Hesston Corporation, Hesston, Kans.

[21] Appl. No.: 102,094

[22] Filed: Sep. 29, 1987

[51] Int. Cl.[4] .......................... A01D 39/00; B30B 9/30
[52] U.S. Cl. ........................................ 100/88; 100/99; 56/341
[58] Field of Search ............... 100/88, 89, 99; 56/341, 56/342, 343

[56] References Cited

U.S. PATENT DOCUMENTS

| 4,517,795 | 5/1985 | Meiers | 100/99 X |
| 4,624,179 | 11/1986 | Yves et al. | 100/99 X |
| 4,624,180 | 11/1986 | Strosser | 100/191 X |
| 4,633,720 | 1/1987 | Dybel et al. | 100/99 X |
| 4,674,403 | 6/1987 | Bryant et al. | 100/99 X |
| 4,742,768 | 5/1988 | Sheehan et al. | 100/99 |
| 4,748,802 | 6/1988 | Strosser et al. | 56/341 |

Primary Examiner—Peter Feldman
Attorney, Agent, or Firm—Hovey, Williams, Timmons & Collins

[57] ABSTRACT

In a rotary crop baler for producing cylindrical crop bales, a simulated bale size and shape indicator is provided which provides the baler operator with a graphic representation of the size and shape of the bale being formed in the baler. The preferred indicator includes a potentiometer for producing a signal representative of the overall size of the bale, a plurality of potentiometers for producing corresponding signals representative of the shape of the bale, and an indicator including a signal processor and display liquid crystals or the like for producing the graphic simulation of the size and shape of the bale being formed.

14 Claims, 2 Drawing Sheets

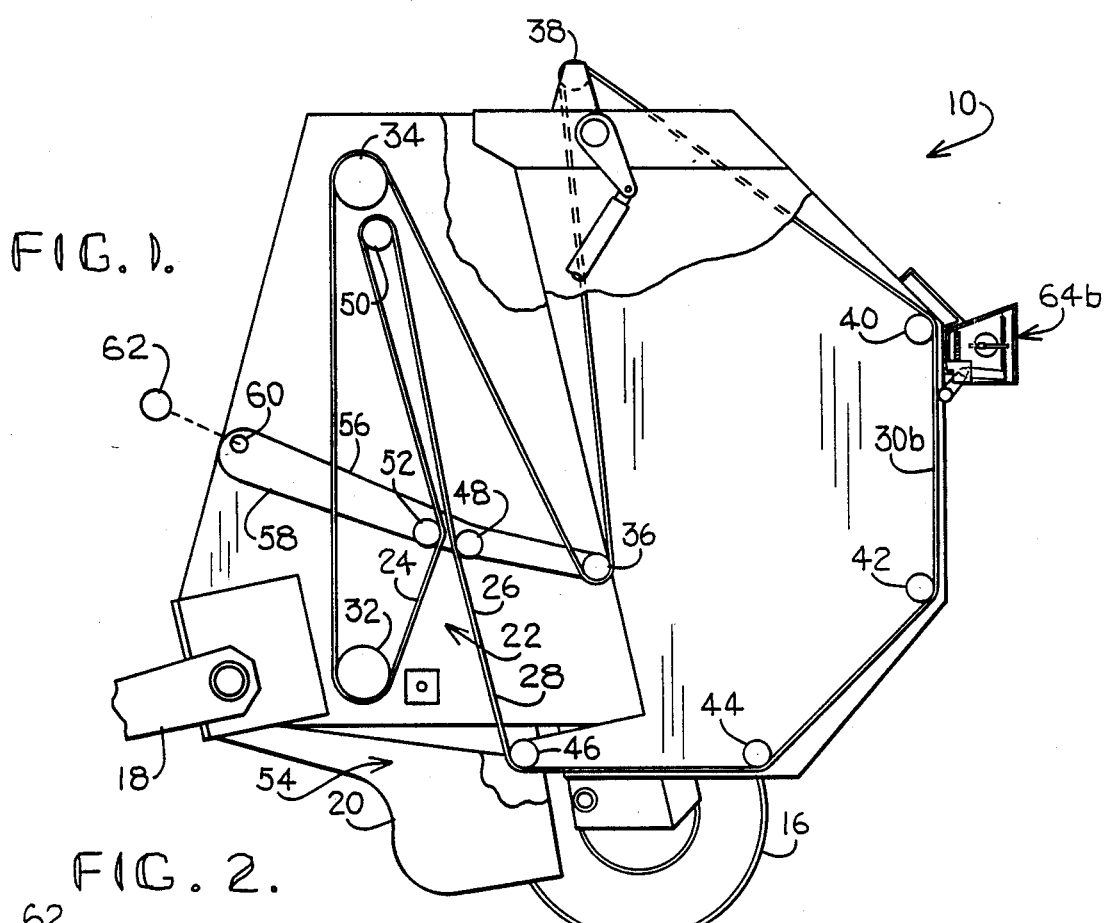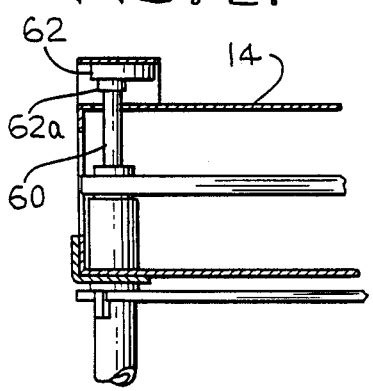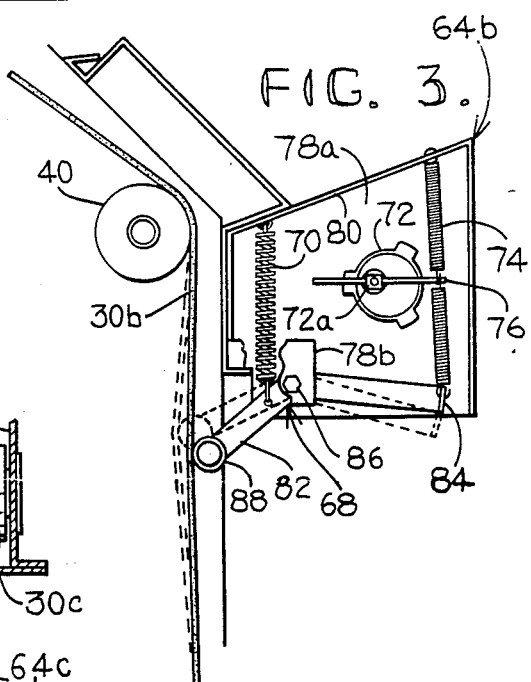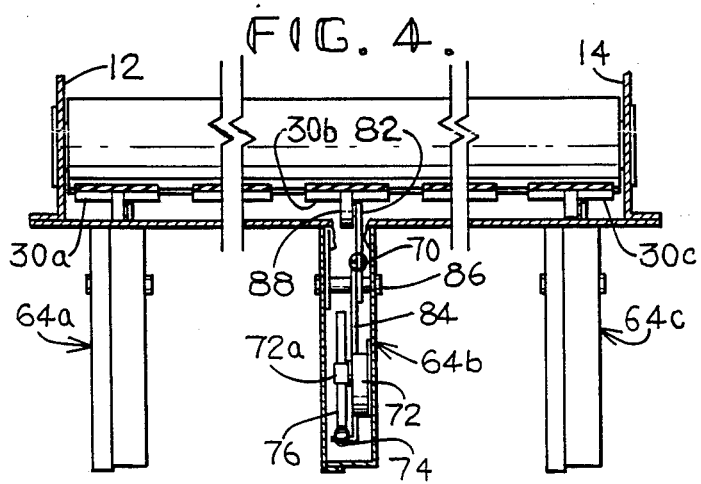

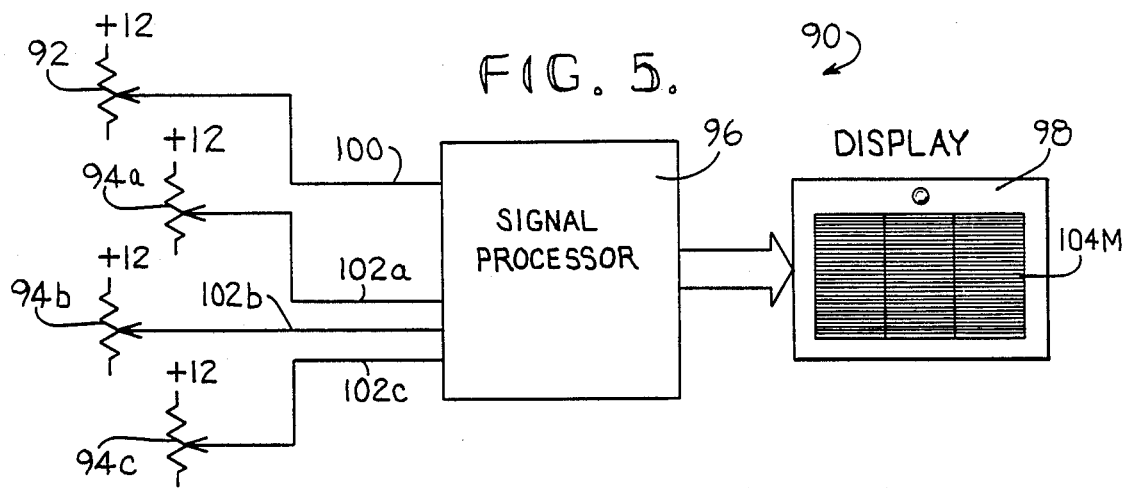
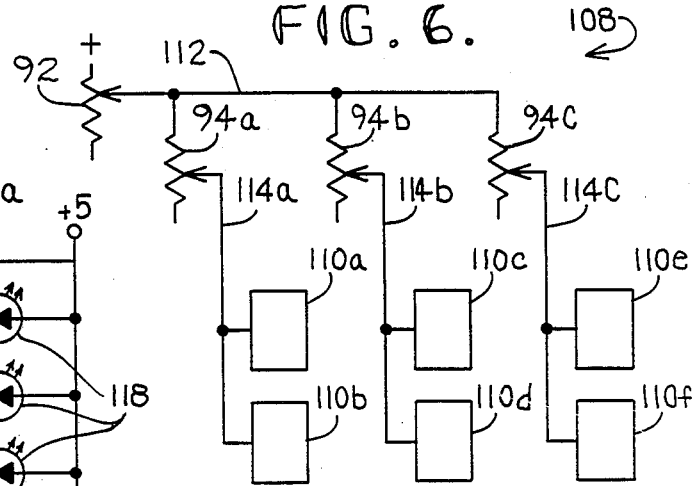
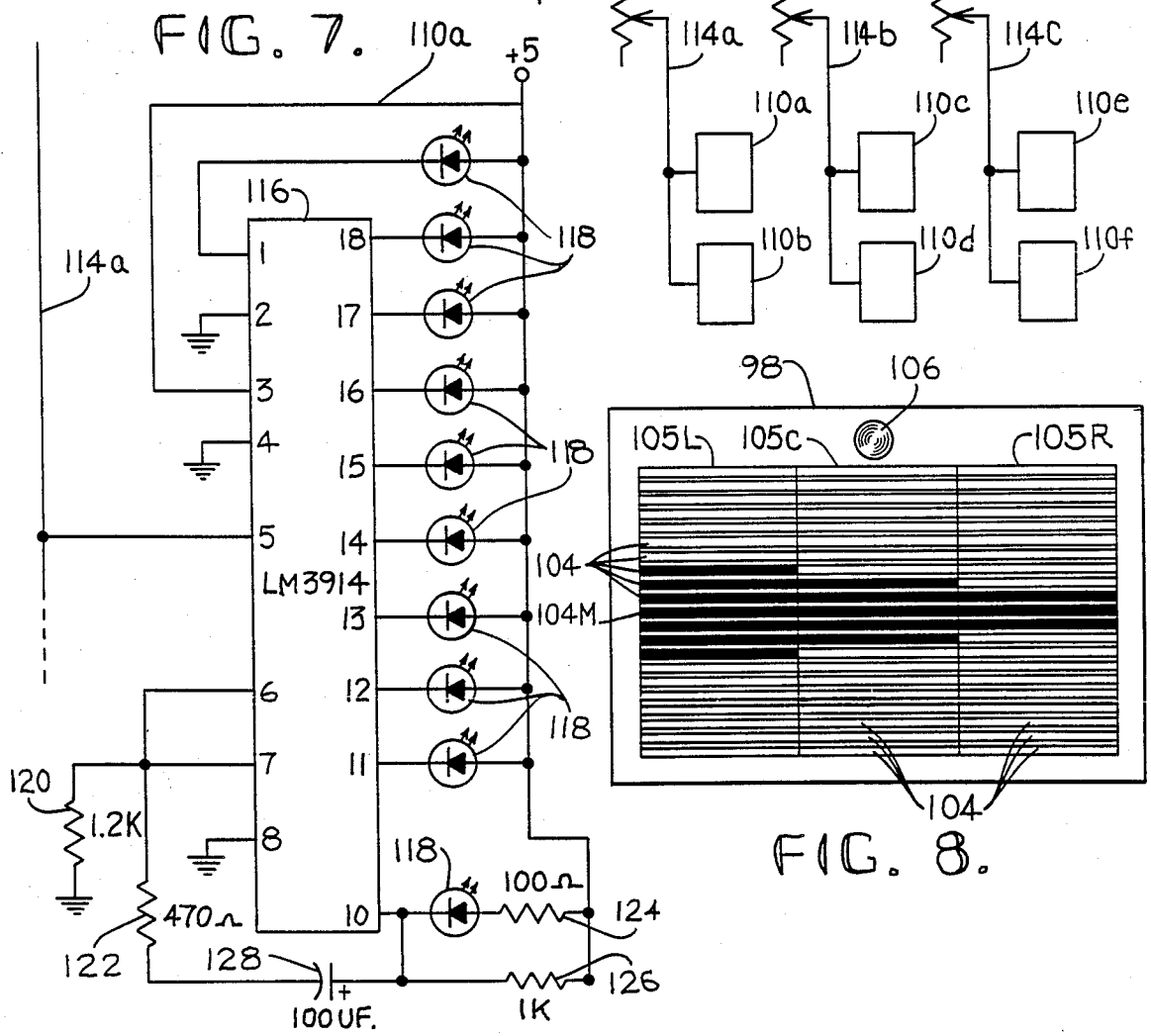

ROUND BALER HAVING SIMULATED BALE SIZE AND SHAPE INDICATOR

BACKGROUND OF THE INVENTION

1. Field of the Invention

This invention relates to the field of rotary balers, particularly that type of rotary baler capable of producing large, so-called "round" cylindrical bales normally weighing 1,000 to 2,000 pounds. More particularly, the invention relates to a simulated bale size and shape indicator for the baler which produces a graphic simulation of the size and shape of the bale being formed.

2. Description of the Prior Art

As a typical rotary baler is driven along a crop windrow and crop material is continuously picked up and loaded into the baling chamber of the machine, a situation frequently arises in which the baling chamber is not loaded uniformly from one axial end thereof to the opposite end thereof. This is due largely because of the relatively narrow width of the windows compared to the overall length of the baling chamber, and unless the operator skillfully weaves his away along the windrow, the center of the baling chamber will necessarily become more heavily loaded than its opposite ends. This results in a bale which may be highly dense and fat in the middle but less dense and of smaller diameter at its opposite ends.

To aid the operator in avoiding the production of misshapen bales, various devices have been provided to provide information to the operator of the condition of the bale being formed in the baler. For example, U.S. Pat. No. 4,224,867 which is hereby incorporated by reference discloses a pair of belt-tension sensors provided in association with the tensioning belts of the baler that correspond to the ends of the bale being formed. When the tension of either of the belts decreases relative to the other as a result of insufficient crop material at that particular end of the bale, the appropriate sensor closes a switch which in turn energizes an electrical circuit to actuate a signal device such as a light. Two such signal devices are employed, one for each end of the bale, and depending upon which device is actuated, the operator may take corrective measures for that particular end of the bale as indicated by activation of the corresponding light.

The prior art also discloses a system similar to that as disclosed in the '867 patent except that analog gauges are provided in place of the signal lights. Misalignment of the pointers of the respective gauges indicates a corresponding misshapen condition of the bale being formed in the baler.

These prior art devices present two problems. First, they do not provide information to the baler operator concerning the center of the bale being formed so that a bale could emerge having a relatively small diameter in the middle of the bale as compared to the ends. Secondly, the prior art devices do not inform the operator of the size of the bale being formed but only of the relative diameter of one bale end as compared to the other. Thus, the operator does not know if sufficient baling chamber space is remaining in which to make sufficient correction to a misshapen bale.

SUMMARY OF THE INVENTION

The present invention defines a substantial improvement over the prior art by providing a graphic illustration simulating the appearance of the bale being formed whereby the operator of the baler can tell at a glance both the size and shape of the bale being formed.

The preferred simulated bale size and shape indicator of the present invention includes potentiometer coupled with the slack takeup and tensioning arm of the baler which produces an output signal representative of the overall size of the bale, and three potentiometers coupled to respective forming belts engaging the center and opposed ends of the bale for producing signals representative of the shape of the bale, and an indicator responsive to the bale size and shape signals for producing a graphic simulation indicative of the size and shape of the bale on a display including liquid crystal segments, light emitting diodes, or a cathode ray tube.

BRIEF DESCRIPTION OF THE DRAWING FIGURES

FIG. 1 is a schematic, side elevational illustration of a rotary baler with a near sidewall thereof removed to reveal mechanisms within the baler, such baler incorporating a simulated bale size and shape indicator in accordance with the principals of the present invention;

FIG. 2 is an enlarged, fragmentary, detailed view of the bale size sensor of the indicator showing the way it is coupled to the slack takeup and tension arm of the baler;

FIG. 3 is an enlarged, fragmentary, cross sectional view through the rear of the baler illustrating one of the bale shape sensors of the indicator;

FIG. 4 is an enlarged, fragmentary, plan view of the rear of the baler showing the bale shape sensors;

FIG. 5 is an electrical schematic representation of the first preferred embodiment of the indicator;

FIG. 6 is an electrical schematic drawing of a second preferred embodiment of the indicator;

FIG. 7 is an electrical schematic diagram of one of the display drivers of FIG. 6; and FIG. 8 is an illustration of the appearance of the preferred display representing the size and shape of the bale being formed in the baler.

DETAILED DESCRIPTION OF THE PREFERRED EMBODIMENTS

The present invention is preferably incorporated as part of a round baler 10 such as a Round Baler Model 5580 manufactured by Hesston Corporation of Hesston, Kansas. Referring to FIGS. 1-4, baler 10 includes a pair of laterally spaced apart sidewalls 12 and 14 carried by ground wheels 16 (only one being shown) for advancement across a field in response to pulling force supplied to a generally fore-and-aft extending tongue 18 at the front of sidewalls 12, 14. A suitable power transmission device (not shown) incorporated as part of baler 10 is normally connected to the power-take off shaft of a tractor or other vehicle towing baler 10 for thereby supplying driving power to the various moving components of baler 10 including crop pickup 20 thereof which may be of conventional design.

Because sidewalls 12, 14 are laterally spaced-apart respective to the normal path of travel of baler 10, room is provided therebetween for formation and transport of a bale of crop material formed by material which is picked up and loaded into the space between sidewalls 12, 14 by pickup 0. Hence, sidewalls 12, 14 cooperate in part to define a baling chamber broadly denoted by numeral 2, the opposite ends of which are defined by sidewalls 12, 14. The fore-and-aft limitations of chamber 22 are defined by opposed, initially generally vertically disposed stretches 24 and 26 of an endless, flexible web means broadly denoted by the numeral 28 and preferably comprising a series of endless, side-by-side, flexible rubber belt elements 0 having their respective longitudinal axes disposed in a plane parallel to sidewalls 12, 14.

Endless belts 30 are looped around a number of cylindrical rolls spanning the distance between sidewalls 12, 14. For example, roll 32 adjacent the lower front end of chamber 22 may be driven by the output of the power transmission mechanism (not shown) so as to provide motive force for driving belts 30 longitudinally of themselves, and, proceeding clockwise around the baler as viewed in FIG. 1, the other rolls may be idlers including rolls 34, 36, 38, 40, 42, 44, 46, 48, 50, and 52. Roll 32 generally defines the forward end of chamber 22, roll 46 generally defines the rearward end thereof, and roll 50 in cooperation with rolls 48 and 52 generally defines the upper end thereof. Additionally, roll 50 in cooperation with rolls 48 and 52 serves to hold stretches 24, 26 in substantially upright dispositions at the initiation of a baling cycle. Roll 32 is driven in a clockwise direction such that front stretch 24 moves downwardly while rear stretch 26 moves upwardly.

The bottom of chamber 22 is open to present a crop inlet 54 from pickup 20.

The dimensions of chamber 22 increase in a fore-and-aft direction during bale growth as front and rear stretches 24, 26 bow out in respective fore-and-aft directions to accommodate growth of a bale being formed within chamber 22 under the driving force of stretches 24, 26 as additional crop material is continuously loaded into chamber 22 via inlet 54. Stretches 24, 26 must thus lengthen as the circumscribe the growing bale of progressively increasing circumference, yet at the same time it is important that stretches 24, 26 maintain a compactive force against the bale being formed in order to properly densify the same as it forms and to assure that stretches 24, 26 actually drive the bale instead of simply slipping along the surface thereof.

Accordingly, a suitable slack takeup and tensioning mechanism broadly denoted by numeral 56 is provided. Mechanism 56 may take the form, for example, of a generally horizontally disposed swingable arm structure 58 provided with idler rolls 36, 48, and 52 about which belts 30 are looped in the manner shown in FIG. 1. Arm structure 58 also includes mounting shaft 60 at the forward end thereof for pivotally mounting arm 58 between sidewalls 12, 14. Roller 36 is disposed at the rearward end of arm structure 58 so that the weight of arm 58 maintains a corresponding tension on belts 30 by way of roller 36.

As belt stretches 24, 26 expand during formation of a bale, arm structure 58 pivots upwardly about mounting shaft 60 whereby the rearward end thereof moves upwardly to pay out additional slack while maintaining the tension on belts 30. Rollers 48 and 52 mounted to arm structure 58 also move upwardly therewith to define the upper end of chamber 22 and to ensure that stretches 24, 26 encompass the upper portion of the bale being formed. As arm structure 58 rotates, mounting shaft 60 also correspondingly rotates; the rotational position of shaft 0 is indicative of the size of the bale being formed in chamber 22.

Bale size signal means 62 is included as part of the present invention and is preferably a Position Indicator Sender such as that manufactured by VDO Instruments, Inc., of Winchester, Va. Bale size signal sender 62 includes rotation element 62a which is coaxially mounted to one end of mounting shaft 60 (FIG. 2) and produces an electrical signal, to be explained further hereinbelow, corresponding to the rotational position of shaft 60 which position is representative of the size of the bale being formed in chamber 22.

The present invention also includes three identical bale shape signal mechanisms 64a, 64b, and 64c. Bale shape signal mechanisms 64a–c are mounted in association with corresponding belt elements 30a, 30b, and 30c. Belt element 30a is that nearest to sidewall 12, belt element 30b is the centermost belt element, and belt element 30c is the belt element nearest sidewall 14. Mechanisms 64a–c are mounted to the rear of baler 10 at spaced-apart locations corresponding to belt elements 30a–c respectively.

Mechanism 64b (FIGS. 4 and 5) includes housing 66, pivotally mounted slack sensing arm 68, arm biasing spring 70, bale shape signal means 72, dual spring 74, and sender actuating rod 76, it being understood that mechanisms 64a and 64c are identical to mechanism 64b.

Housing 66 presents walls for protecting components 68–76 from exposure to the elements and includes sidewalls 78a and 78b, and upper wall 80.

Slack sensing arm 68 includes forward leg 82, rearward leg 84, mounting bolt 86 pivotally mounting arm 68 to housing sidewall 78a and 78b through the juncture of legs 82, 84, and slack sensing wheel 88 rotatably mounted at the forward end of forward leg 82 for engaging belt element 30b. The upper end of arm biasing spring 70 is coupled to housing upper wall 80 and the other end is coupled to forward leg 82 and yieldably biases sensing arm 68 in a clockwise direction as shown in FIG. 3 whereby sensing wheel 88 is maintained in contact with belt element 30b.

Dual spring 74 intercouples the rearward end of rearward leg 84 with housing upper wall 80.

Bale shape signal means 72 is preferably identical to sender 62 and is attached to housing sidewall 78a. Actuating rod 76 is mounted through rotation element 72a with the rearward end of rod 76 coupled to the midpoint of dual spring 74.

If a bale being formed in baler 10 is of non-uniform diameter, one or more of belt elements 30 will become slack relative to the other belt elements. If, for example, the center of the bale being formed has a lesser diameter than the respective ends, belt element 30b (FIG. 3) will experience relative slack compared to the other belt elements 30. This slack position is shown in dashed lines in FIG. 3. When this occurs, arm biasing spring 70 causes slack sensing arm 68 to rotate clockwise to the position shown in dashed lines in FIG. 3 in order to maintain sensing wheel 88 in contact with belt element 30b. When sensing arm 68 rotates, downward motion of rearward leg 84 elongates dual spring 74 which thereby causes clockwise rotation (as viewed in FIG. 3) of sender actuating rod 76. This in turn rotates signal sender element 72a which correspondingly alters the output signal off signal means 72 as will be explained further hereinbelow in connection with FIGS. 5–7.

The net result is that sender 72 produces a signal corresponding to the slack or lack thereof of belt element 30b. Similarly, bale shape signal mechanisms 64a–c also produce signals corresponding to the relative slack or lack thereof of belt elements 30a and 30c respectively.

Turning now to the electrical components of the present invention, FIG. 5 illustrates the first preferred electrical circuit 90 of the present invention. Electrical circuit 90 includes bale size potentiometer 92, bale shape potentiometers 94a, 94b, and 94c, signal processor 96, and bale size and shape display 98.

Bale size potentiometer 92 is included as part of bale size signal means 62 and is connected such that rotation of mounting shaft 60 correspondingly rotates signal rotation element 62a which varies the electrical resistance of potentiometer 92. Similarly, bale shape potentiometers 94a-c are included as part of the respective signal means of bale shape signal mechanisms 64a-c.

One side of each potentiometer 92 and 94a-c is connected to +12 v.d.c. which is preferably and conveniently supplied by the battery of the tractor towing baler 10 by way of a suitable conventional voltage stabilizing and supply circuit (not shown).

The output taps from each potentiometer 92, 94a-c are respectively coupled to signal processor 96 via lines 100, 102a, 102b and 102c. The voltages supplied from potentiometers 92, 94a-c range from near 0 v.d.c. to +12 v.d.c. In the case of potentiometer 92, the voltage output at +12 v.d.c. corresponds to a fully formed bale which corresponds to the position of takeup mechanism 56 when it is fully rotated counterclockwise (FIG. 1). An output voltage of +12 v.d.c. from potentiometers 94a-c corresponds to a no-slack condition on the respective belt elements, and a lower voltage corresponds to relatively greater slack.

Signal processor 96 is preferably a conventional microcomputer or microprocessor with associated conventional components. More particularly, signal processor 96 includes appropriate conventional input circuitry for buffering the analog input via lines 100 and 102a-c and for converting the inputs into a digital format. Processor 96 also includes appropriate conventional output devices for providing a suitable output for display 98.

Display 98, as further illustrated in FIG. 8, is preferably composed of appropriately configured liquid crystals, light emitting diodes, or a cathode ray tube (CRT), as a matter of design choice, in order to provide a visually perceptible graphic simulation to the baler operator of the size and shape of the bale being formed in baler 10.

FIG. 8 specifically illustrates that the bale being formed is misshapen with the diameter of the bale being greatest on the left and decreasing in diameter to the rightmost end of the bale. With this graphic illustration, the baler operator knows at a glance that the baler should be steered to the left in order to introduce more crop material into the rightmost side of the bale chamber. The operator also knows at a glance that the bale is only about one-third complete in its formation process, and that there is adequate baler chamber space remaining so that a course correction of the baler will enable the production of a perfectly formed bale.

The graphic simulation on display 98 is preferably produced by a plurality of segments 104 arranged in three columns, left column 105L, center column 105C, and right column 105R, respectively corresponding to the left, center, and right portions of the bale. As illustrated, each column includes twenty elongated, horizontally disposed segments respectively arranged above and below an additional middle segment 104M. Segments 104 are arranged in corresponding pairs disposed respectively on opposed sides of middle segment 104M, the segments of a given pair being equally spaced from middle segment 104M. The segments that are activated are illuminated in pairs with middle segment 104M being included or illuminated constantly as a reference whenever baler 10 is operating.

Segments 104 are preferably composed of appropriately configured liquid crystals, light emitting diodes, or images formed on the screen of a CRT. At least twenty-one segments per column are preferred to provide sufficient resolution for the graphic simulation of the bale.

Display 98 also includes a bale complete light 106 which indicates that bale formation is complete and the bale should be dumped.

The output from signal processor 96 to display 98 is configured as appropriate for the chosen makeup of display 98 according to conventional techniques well known to those skilled in the art.

In the operation of circuit 90, as illustrated in FIG. 5, middle segment 104M of each column is initially activated when the unit is turned on and corresponds to an empty bale chamber. Assuming for the moment that no misshaping of the bale being formed occurs, an additional pair of segments on either side of the center segment and each column of display 98 is activated upon each increase of 1.2 v.d.c. from potentiometer 92 via line 100. That is to say, each column 105 has ten segments 104 on either side of middle segment 104M and a full scale output from potentiometer 92 of +12 v.d.c. corresponds to +1.2 v.d.c. per segment pair activated. Thus, when the bale being formed is 10% complete, three segments in each column would be activated which corresponds to middle segment 104M plus one segment 104 above and one segment 104 below. When bale formation is complete, all 21 segments would be activated corresponding to an input of +12 v.d.c. from potentiometer 92.

Bale complete light 106 is illuminated by signal processor 96 when the input via line 100 reaches +12 v.d.c.

Bale shape potentiometers 94a-c are preferably arranged and calibrated so that each provides a +12 v.d.c. output voltage when bale formation is proceeding uniformly with no difference in bale shape diameter as indicated by no slack in belts 30a-c. This condition would result in the same number of segments being activated in each column.

If, however, one or more portions of the bale does not receive sufficient crop material and becomes undersized, the voltage output from the potentiometers corresponding to the undersized portions will be less than +12 v.d.c. Signal processor 96 then deactivates segment pairs corresponding to each 1.2 volt difference from +12 v.d.c.

For example, FIG. 8 illustrates the condition where the leftmost portion of the bale is such that bale size potentiometer 92 is producing an output of +3.6 v.d.c. which results in three segment pairs in addition to the center segment being activated in the leftmost column. Bale shape potentiometer 94a corresponding to the leftmost portion of the bale and corresponding to the leftmost segment column 105L, is producing +12 v.d.c. indicating no slack on belt 30a.

However, as illustrated in FIG. 8, the center of the bale being formed has a lesser diameter and as a result bale shape potentiometer 94b is producing an output at 10.6 v.d.c. (that is, 12 v. −1.2 v.). In response to this, signal processor 96 deactivates one segment pair from center column 105C to display a total of five segments as shown.

Furthermore, potentiometer 94c is producing output at 9.6 v.d.c. (12 v. −2.4 v.) which results in signal processor 96 deactivating two segment pairs in right column 105R to present three activated segments as shown.

FIGS. 6 and 7 illustrate electrical circuit 108 for operating display 98 as a second preferred embodiment using light emitting diodes (LED). As discussed above, LED's can also be used in circuit 90. Circuit 108 includes potentiometers 92 and 94a–c, and display driver circuits 110a, b, c, d, e, and f.

In circuit 108, one side of potentiometer 92 is connected to +12 v.d.c. as shown. The output from potentiometer 92 is connected via line 112 to one side of each potentiometer 94a–c and functions as the supply voltage.

The respective signal outputs from potentiometers 94a–c are produced on lines 114a, 114b and 114c. Line 114a is connected to driver circuits 110a and b. Line 114b is connected to driver circuits 110c and d. Line 114c is connected to driver circuits 110e and f.

With this arrangement of potentiometers 92 and 94a–c, the maximum output voltage from each bale shape potentiometer 94a–c is limited to the output voltage supplied from bale size potentiometer 92 and the respective outputs on lines 114a–c thereby reflect both size and shape information.

Display driver circuits 110a–f are all identical and are correspondingly arranged whereby the LED's thereof make up segments 104. Specifically, the LED's of circuits 110a,b respectively make up segments 104 of left column 105L. The LED's of circuit 110a make up segments 104 above middle segment 104M and the LED's of circuit 110b make up segments 104 below middle segment 104M. The LED's of circuit 110b are arranged as the "mirror" image of the LED's of circuit 110a so that segments 104 are arranged as appropriate segment pairs. The LED's of circuits 110c and d are similarly arranged for center column 105C and the LED's of circuits 110e and f similarly arranged for right column 105R.

Display driver circuit 110a (FIG. 7) includes LED display driver 116 (National Semiconductor #LM3914), ten associated LED's 118, resistors 120, 122, 124, and 126 with the preferred values in OHMS shown in FIG. 7, and capacitor 128 (100m farads). Components 116–128 are conventionally interconnected as shown with input line 114a from potentiometer 94b connected to pin 5 of display driver 116. Preferably, LED's 118 are constructed to present an elongated configuration in order to make up segments 104 as arranged in display 98. Those skilled in the art, however, will appreciate that display driver circuits 110a–f can be chosen or custom made for any number of desired LED's 118.

In operation, successive voltage increments on line 114b cause consecutive illumination of diodes 118 starting with the lowermost diode connected to pin 10. With each predetermined increment of +1.2 v.d.c. the next LED is illuminated. If no slack exists on belt 30a, for example, potentiometer 94a passes the output voltage from potentiometer 92 unattenuated to circuit 110a via line 114a. If slack exists, however, potentiometer 94a attenuates the voltage according to the amount of slack. Thus, each potentiometer 94a–c, attenuates the voltage from potentiometer 92 (which indicates bale size) by an amount corresponding to the slack in respective belts 30a–c (which indicates bale shape). In this way, the appropriate segments 104 are activated or illuminated to present the graphic illustration of bale size and shape on display 98.

We claim:

1. In a rotary crop baler, a bale size and shape indicator for graphically simulating the size and shape of a bale contained within the baler, said indicator comprising:

output means for determining the size and shape of the bale and for producing an output representative of said size and shape, said output means including bale size signal means for sensing the overall size of the bale and for producing bale size signal(s) representative thereof, the baler having flexible web means encompassing the bale and having a slack takeup and tensioning mechanism including a yieldably biased shiftable takeup arm for paying out said additional stretches of said web means as the bale grows in size, the amount of said stretches payed out by said mechanism being indicative of the size of the bale, said bale size signal(s) being representative of the amount of said stretches of said web means payed out by said mechanism and being thereby representative of the size of the bale, said bale size signal means including a potentiometer coupled with said takeup arm for producing said bale size signal(s), and bale shape signal means for sensing the shape of the bale and for producing bale shape signal(s) representative thereof; and indicator means operably coupled with said output means and responsive to said output for producing a visually perceptible graphic simulation of said size and shape of the bale, said indicator means being responsive to said bale size signal(s) and said bale shape signal(s) for producing said graphic simulation.

2. In a rotary crop baler, a bale size and shape indicator for graphically simulating the size and shape of a bale contained within the baler, said indicator comprising:

output means for determining the size and shape of the bale and for producing an output representative of said size and shape, said output means including bale size signal means for sensing the overall size of the bale and for producing bale size signal(s) representative thereof, and bale shape signal means for sensing the shape of the bale and for producing bale shape signal(s) representative thereof, the bale having flexible web means including a plurality of endless, side-by-side flexible belts encompassing the bale, said bale shape signal means including a plurality of potentiometers coupled with said selected plurality of belts for producing said bale shape signal(s), said bale shape signal(s) being representative of the relative slack of a selected plurality of said belts; and indicator means operably coupled with said output means and responsive to said output for producing a visually perceptible graphic simulation of said size and shape of the bale.

said indicator means being responsive to said bale size signal(s) and said bale shape signal(s) for producing said graphic simulation.

3. The indicator as set forth in claim 1, said indicator means including signal processing means for receiving and processing said output and for producing output display signal(s) representative of the shape and size of the bale, and including display means operably coupled with said processing means and responsive to said display signal(s) for producing said graphic simulation.

4. The indicator as set forth in claim 3, said signal processing means including a microcomputer.

5. The indicator as set forth in claim 3, said display means including a plurality of visually perceptible segments arranged in a configuration representative of the appearance of the size and shape of the bale being formed.

6. The indicator as set forth in claim 5, said segments including liquid crystal segments.

7. The indicator as set forth in claim 5, said segments including light emitting diodes.

8. The indicator as set forth in claim 5, said display means including a cathode ray tube display.

9. In a round baler capable of forming crop materials into a cylindrical bale in a baling chamber as the baler is operated, the improvement comprising:

indicator apparatus remote from the baling chamber for displaying a single simulated bale image comprising a graphic illustration resembling the size and shape of an actual bale entirely along the bale axis forming in the chamber; and means operably coupled with the apparatus for sensing the size and shape of at least three portions of the actual bale along its axis or the bale forms in the baling chamber and for controlling the image displayed by the apparatus during such formation.

10. A rotary crop baler comprising:

an expandable baling chamber which increases in size as a bale is being formed therein, the bale forming about a bale axis and including a diameter which may vary along the length of the axis, the size of the baling chamber being representative of the size of the bale;

bale size measuring means for measuring the size of the baling chamber;

bale shape measuring means for measuring the diameter of the bale at a plurality of positions along the bale axis;

indicator means responsive to the bale size measuring means for producing a visually perceptible graphic simulation of the size of the bale and responsive to the bale shape measuring means for producing a visually perceptible graphic simulation of the shape of the bale.

11. The rotary crop baler according to claim 10, wherein the indicator means includes a display having a plurality of visually perceptible segments arranged in a configuration presenting a simulated bale image resembling the bale being formed in the bale chamber.

12. The rotary crop baler according to claim 11, further comprising flexible web means for encompassing the bale, the web means including a slack takeup and tensioning mechanism for paying out additional stretches of the web means, the bale size measuring means measuring the size of the baling chamber by measuring the paying out of the stretches of the web means.

13. The rotary crop baler according to claim 12, wherein the slack takeup and tensioning mechanism includes a swingable arm structure that swings in a first direction during paying out of additional stretches of the web means, the bale size measuring means measuring the size of the baling chamber by measuring the movement of the arm structure.

14. The rotary crop baler according to claim 10, further comprising flexible web means for encompassing the bale, the bale shape measuring means including a plurality of web tension measuring mechanisms each of which is positioned at a desired location along the bale axis and measures the diameter of the bale at the desired location by measuring the tension of the web means at the desired location.

* * * * *